United States Patent Office

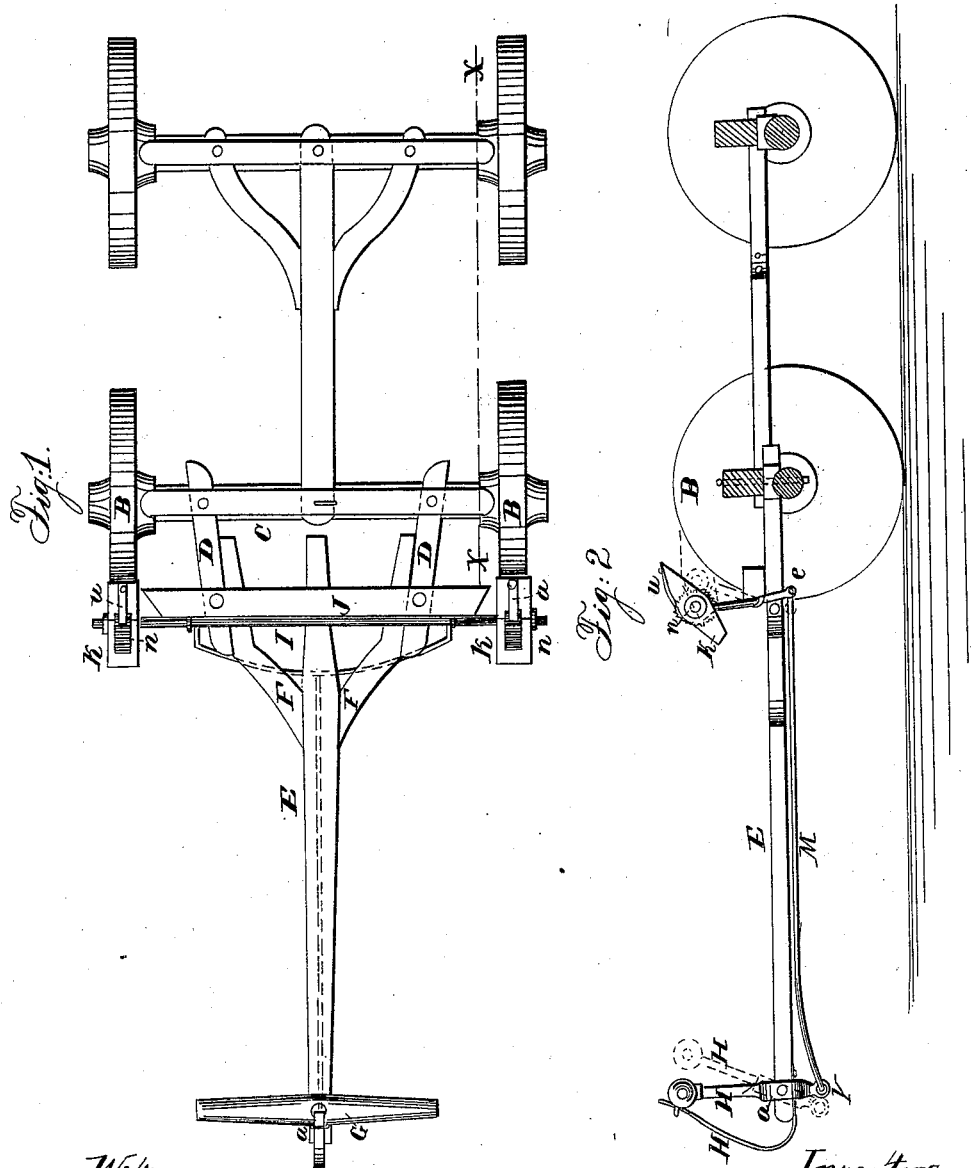

R. O. CODDING AND G. W. PRINGLE, OF CODDINGVILLE, OHIO.

Letters Patent No. 63,020, dated March 19, 1867.

IMPROVEMENT IN WAGON-BRAKE.

The Schedule referred to in these Letters Patent and making part of the same.

TO ALL WHOM IT MAY CONCERN:

Be it known that we, R. O. CODDING and G. W. PRINGLE, of Coddingville, in the county of Medina, and State of Ohio, have invented a new and improved Wagon-Brake; and we do hereby declare that the following is a full, clear, and exact description thereof, reference being had to the accompanying drawings, forming part of this specification.

Our invention has for its object a brake applied to the front wheels of a wagon and other vehicles in descending a hill, to relieve the team from the pressure of the load. It consists in attaching the neck-yoke to the upper end of a vertical lever pivoted a little below its centre to the end of the pole or tongue. The lower end of the lever is connected by a joint to the end of a bifurcated bar that extends back and connects with two arms which are attached to the brake-bar or shaft.

It also consists in providing anti-friction ratchet-rollers which operate upon the periphery of the two front wheels of a wagon, all being constructed in such a manner as to be automatic in its operation.

To enable others skilled in the art to make and use our invention, we will proceed to describe its construction and operation.

Figure 1 is a top plan view of a wagon with our improved brake attached.

Figure 2 is a longitudinal vertical sectional elevation of the same, taken from the line $x\ x$.

Letters of like name and kind refer to like parts in each of the figures.

A may represent a wagon of common or ordinary construction, a description of which is deemed unnecessary, as we claim no part of it as our invention.

B B are two wheels which run upon the forward axle-tree, C. D D are two hounds or braces secured to the axle-tree C.

E is the pole or tongue, secured to the hounds or braces D D by means of a long pivot-bolt that passes through the braces F F, and hounds D D, so that the end of the tongue may be elevated or lowered.

G is the neck-yoke attached in the centre to the upper end of a vertical lever, H, that is pivoted to the forward end of the tongue or pole E, by a pivot-bolt, $a$.

The lower end of the said lever H is connected at Y to a bifurcated rod or bar, M, that extends backward and connects to two arms, $c\ c$, which are attached and extend downward from the brake-shaft I.

The brake-shaft I is secured and works in eyes which are secured to a cross-bar, J, the said cross-bar J being secured to the top of the braces or hounds D D. The brake-bar or shaft I lies immediately over and across the hounds, until it approaches the two front wheels, B, when it rises by an angle, so as to form a sort of crank-shaft, upon the outer ends of which are the brake-blocks, K K, which work upon the ends of the bar or shaft I. In these blocks, K K, are ratchet-rollers, $n\ n$, which are also secured in their position by means of the arm, or the end of the brake-bar or shaft I, passing through this centre.

$w\ w$ are steel-spring pawls secured to the upper end of the block, which works in the ratchets $n\ n$, so as to prevent the wheels $n\ n$ from turning when brought in contact with the wheels of the carriage, but will allow the wheels to back without friction, as the ratchet-wheels will turn round by the friction produced upon them by the wheels B B.

L is a curved steel spring, one end of which is secured to the end of the tongue, while the other end acts against the neck-yoke and upper end of the pivoted lever H, so as to prevent the brakes acting against the wheels when not desired.

The operation of our improved brake is automatic and reliable. When descending a hill, and the wagon begins to press upon the team, the tongue moves forward, which draws the neck-yoke back, which throws the lower end of the lever forward, which draws with it the rod or bar M, that is connected to the brake-bar or shaft I in such a manner as to bring the friction-wheels $n\ n$ hard upon the wheels B B.

When the pressure upon the team ceases by the action of the springs L, the neck-yoke is thrown forward, and the brakes or wheels $n\ n$ become disengaged from the wheels.

Having thus described our invention, what we claim as new, and desire to secure by Letters Patent, is—

1. The pivoted lever H, and rod or bar M, operating the brake-bar or shaft I, and ratchet-wheels $n\ n$, substantially as herein shown and described, and for the purposes set forth.

2. We claim the ratchet-wheels *n n*, operating substantially as shown and described, in combination with the brake-bar or shaft I, as and for the purposes set forth.

3. We also claim the spring L, and neck-yoke G, in combination with the pole or tongue E, substantially as shown and described.

R. O. CODDING,
G. W. PRINGLE.

Witnesses:
C. JACKMAN,
J. C. DAILEY.